UNITED STATES PATENT OFFICE.

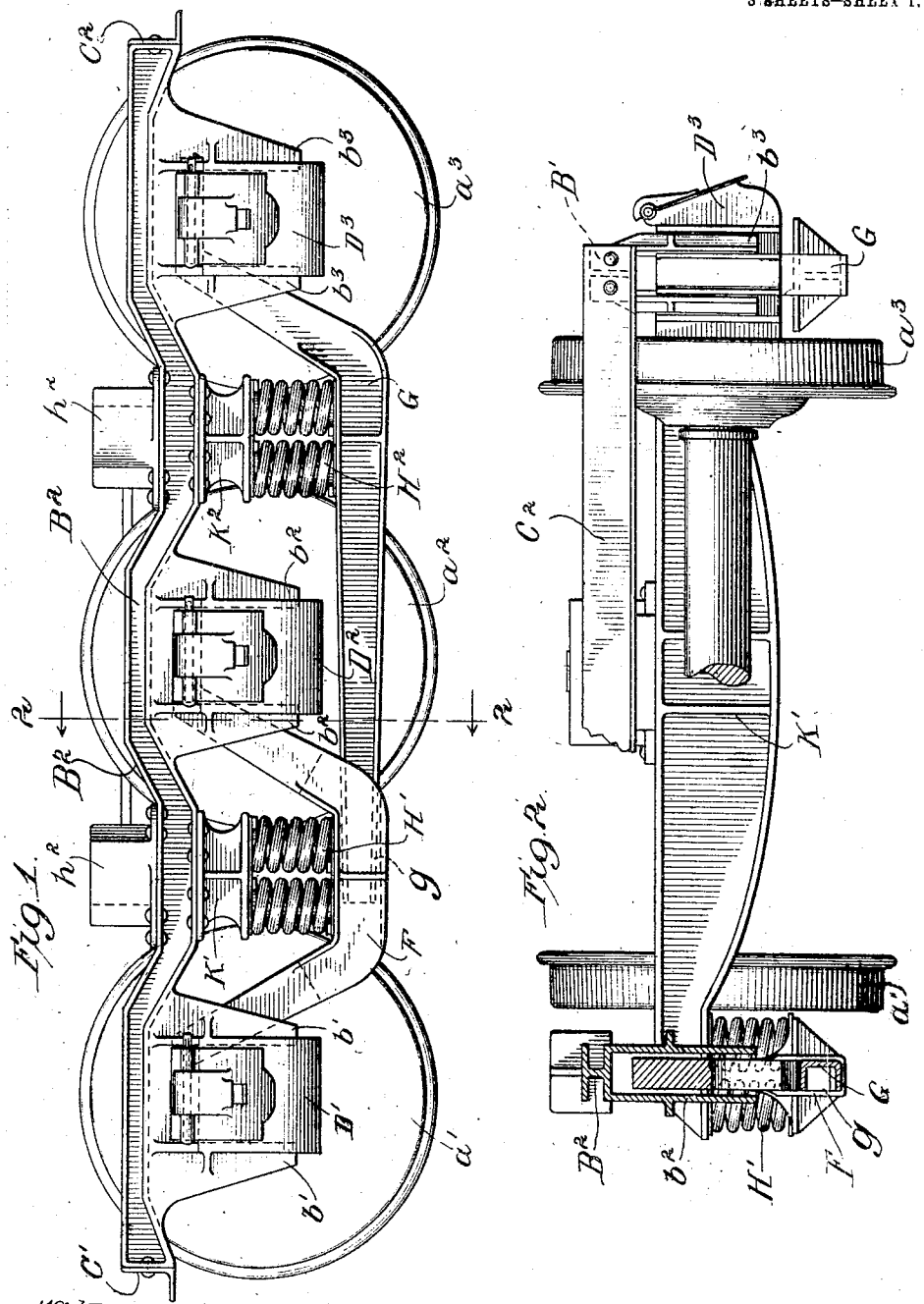

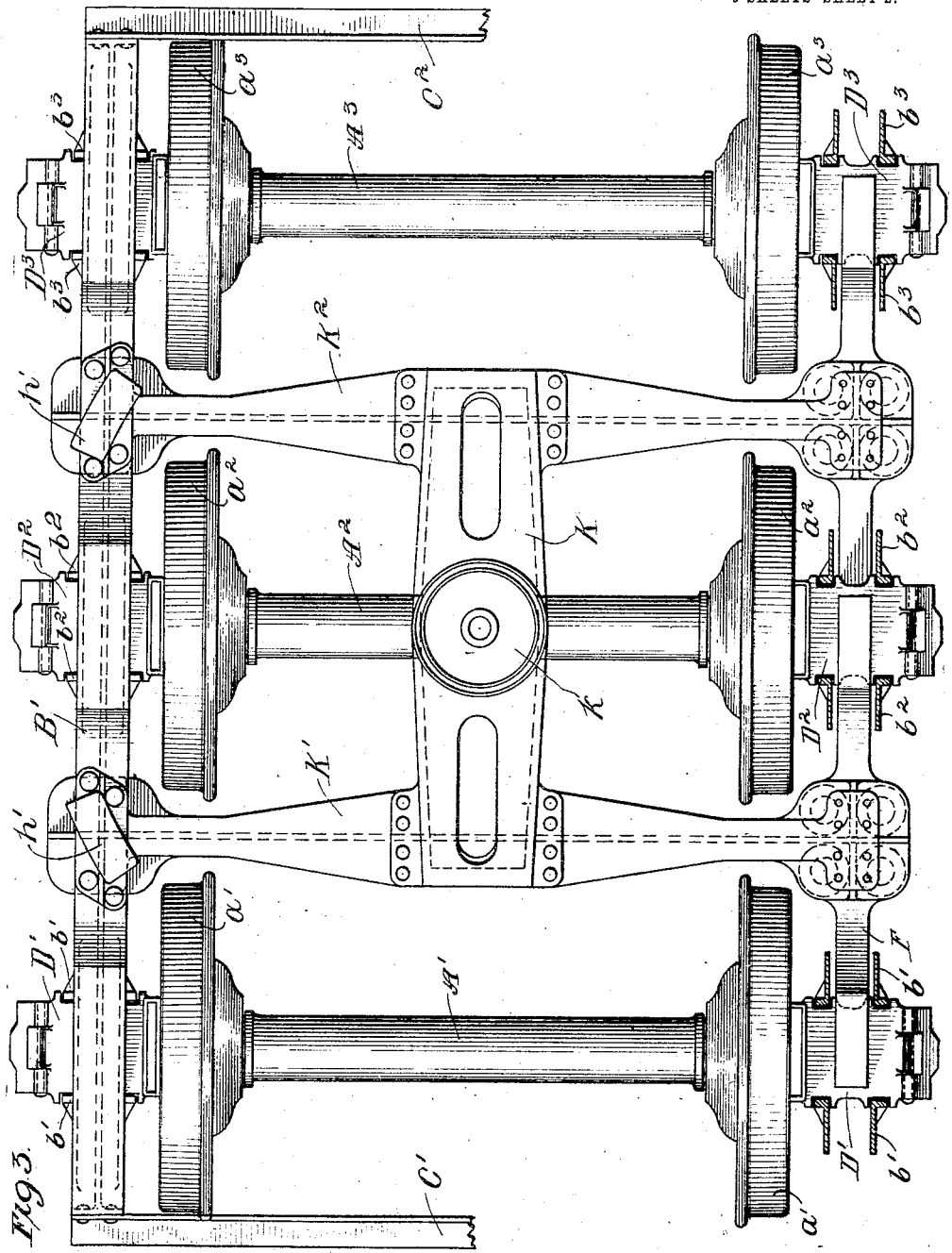

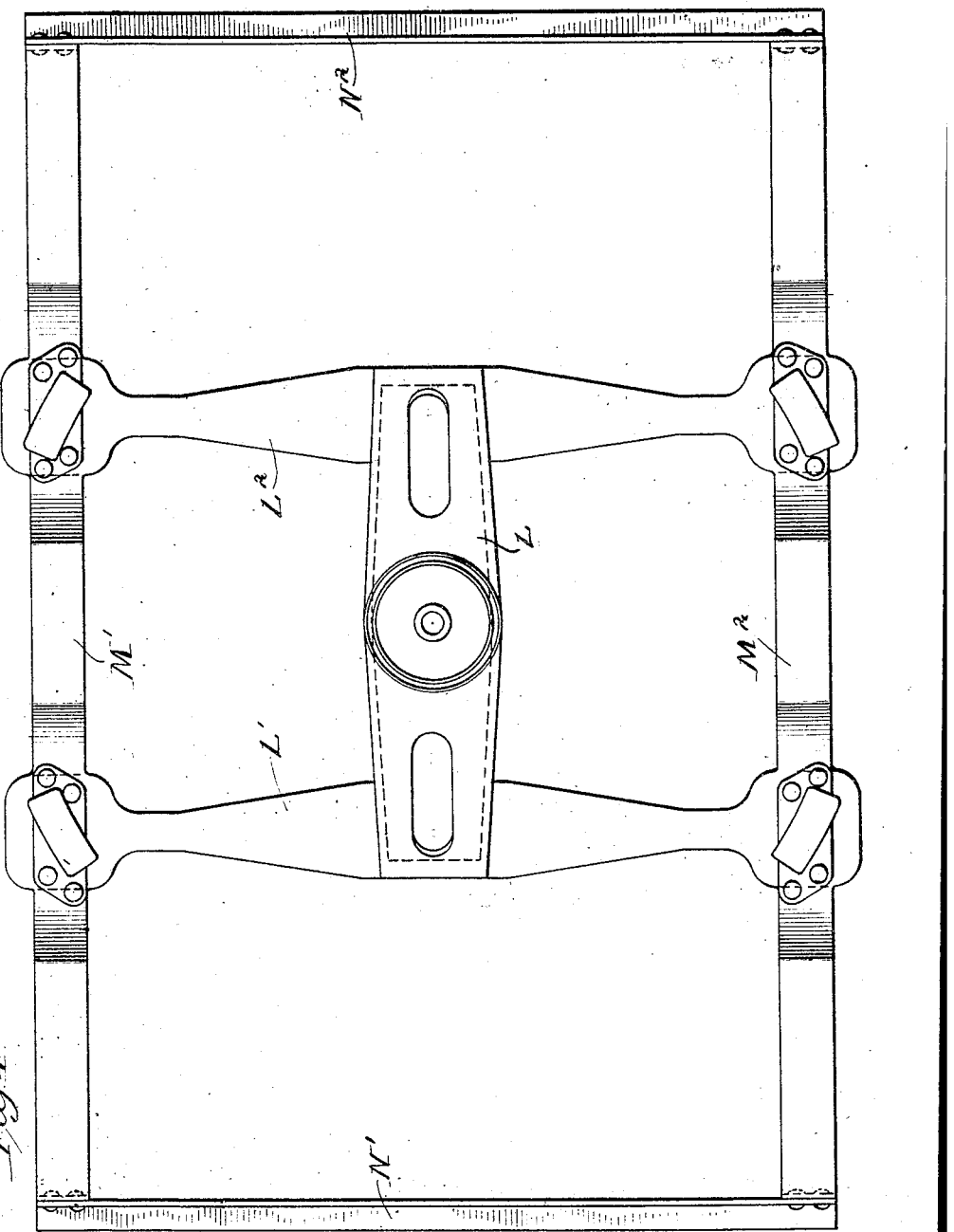

JOHN O. NEIKIRK, OF MORGAN PARK, ILLINOIS, ASSIGNOR TO NATIONAL DUMP CAR COMPANY, OF CHICAGO, ILLINOIS, A CORPORATION OF MAINE.

CAR-TRUCK.

1,098,749.

Specification of Letters Patent.

Patented June 2, 1914.

Application filed December 2, 1912. Serial No. 734,588.

*To all whom it may concern:*

Be it known that I, JOHN O. NEIKIRK, a citizen of the United States, residing at Morgan Park, in the county of Cook and State of Illinois, have invented certain new and useful Improvements in Car-Trucks, of which the following is a specification.

My invention relates in general to car trucks, and more particularly to six-wheel car trucks especially designed for freight cars.

Freight cars now under construction have a capacity of 150,000 pounds, which is an increase of fifty per cent. over the capacity of the largest freight cars heretofore constructed. This increased weight renders it desirable that the cars should be supported upon six-wheel trucks, as too great weight would be imposed upon the wheels of the ordinary four-wheel trucks now generally used.

Six-wheel trucks heretofore constructed have been provided with equalizer bars extending from the journal boxes of the central axle to the journal boxes of the outside axles, upon which rest the springs for supporting the truck frame. In order to equalize the weight upon the wheels, the portions of the equalizer bars between the points where the springs rest and the central axle must be twice the length of the portions of the equalizer bars between the points where the springs rest and the outside axles. This arrangement necessitates a length of wheel base undesirable for the trucks of freight cars, especially when such cars are formed with bottoms composed of drop doors, as the extent of the drop of the doors above the trucks is necessarily less than that of the doors between the trucks. It is, therefore, desirable that the length of wheel base for six-wheel trucks for use on freight cars should be as short as possible in order that a maximum portion of the floor area may be composed of drop doors, which will have a maximum opening, and only as small a portion as possible of the car floor overlies the car trucks.

The primary object of my invention is to provide a six-wheel car truck in which the load will be equally distributed upon the wheels, and in which a minimum length of wheel base will be required.

A further object of my invention is to provide a six-wheel car truck, which will be simple in construction, durable in use, and efficient in operation.

My invention will be more fully disclosed hereinafter with reference to the accompanying drawings, in which the same is illustrated as embodied in a convenient and practical form, and in which—

Figure 1 is a side view; Fig. 2, an end elevational view partially broken away at one side; Fig. 3, a plan view, one side being shown in horizontal section and the end connecting bars broken away; and Fig. 4, a plan view of a modified construction in which the side frames, bolsters and center plate bar are all cast integrally.

The same reference characters are used to designate similar parts in the several figures of the drawings.

Reference characters $A'$, $A^2$ and $A^3$ designate the three axles upon which are fixed the pairs of wheels $a'$, $a^2$ and $a^3$, respectively.

$B'$ and $B^2$ designate the side frames of the truck, each of which is provided with three pairs of depending pedestal jaws $b'$, $b^2$ and $b^3$. Each of the side frames in the form of my invention shown in Figs. 1, 2, and 3 is formed integrally with the three pairs of pedestal jaws depending therefrom. The ends of the side frames $B'$ and $B^2$ are rigidly connected by end bars $C'$ and $C^2$ which may be conveniently formed of angle irons riveted to flanges on the ends of the side frames.

$D'$, $D^2$ and $D^3$ designate the three journal boxes supported on the corresponding ends of the axles $A'$, $A^2$, and $A^3$, and in engagement with the pairs of pedestal jaws $b'$, $b^2$ and $b^3$, respectively.

$F'$ designates an equalizer bar which is supported at its ends upon the journal boxes $D'$ and $D^2$. One of such equalizer bars is, of course, provided at each side of the truck.

$G$ indicates a supplemental equalizer bar, one end of which overlies and is supported upon the journal box $D^3$ and the other end of which extends into a pocket $g$ formed in the intermediate depending portion of the equalizer bar $F$, so that the end of the supplemental equalizer bar $G$ opposite to that supported upon the journal box $A^3$ is supported by the equalizer bar $F$ at a point intermediate of the journal boxes $D'$ and $D^2$. One of the supplemental equalizer bars $G$ is of course provided on each side of the truck.

Resting upon each equalizer bar F is a pair of coiled springs H' which support the overlying end of a bolster K', the opposite end of such bolster being supported upon a similar pair of coiled springs H resting upon the equalizer bar F' at the opposite side of the truck. H² designates a pair of coiled springs resting upon the supplemental equalizer bar G at a point intermediate of the journal boxes D² and D³ and supporting the overlying end of a bolster K², the opposite end of such bolster being supported by a similar pair of coiled springs resting upon the equalizer bar G at the opposite side of the truck.

K designates a beam extending longitudinally of the truck at the center thereof and supported at its ends upon the bolsters K' and K². Upon the beam K is supported the usual center bearing $k$.

$k'$ and $k^2$ designate pairs of side bearings which are mounted upon the side frames B' and B² at points intermediate of the wheels, the side frames being preferably depressed between the wheels to form seats upon which are secured in any suitable manner, as by means of rivets, the pairs of side bearings.

The operation of my improved six-wheel truck is as follows: The end of the car is supported upon the center bearing $k$ and its load transmitted to the bolsters K' and K², to the side frames B' and B², and thence through the pairs of coiled springs H' and H² to the equalizer bars F and supplemental equalizer bars G. The equalizer bars and supplemental equalizer bars transmit the load to the journal boxes, so that the weight of the end of the car is transmitted to the journal boxes and thence to the wheels. It is necessary that one third of the load supported by the truck should be transmitted to each pair of wheels in order that the weight sustained by the truck may be equally distributed to the six wheels. One-half of the load is transmitted to each of the bolsters K' and K², and as the bolster K' is supported at its ends at the centers of the equalizer bars F, it is obvious that one half the load on the truck is divided between the pairs of wheels $a'$ and $a^2$. It is, however, necessary that the pairs of wheels $a'$ and $a^2$ should support two thirds of the load upon the truck and the remaining pair of wheels $a^3$ support the other one third of the load. This is accomplished through the supplemental equalizer bars G upon which the ends of the bolster K² are supported at points intermediate of the pairs of wheels $a^2$ and $a^3$. The portion of each supplemental equalizer bar G between the springs H² and the journal box D³ is one half the length of the portion of the supplemental equalizer bar between the springs H² and the end thereof which is supported at the center of the equalizer bar F. It is therefore evident that the half of the load on the truck which is supported by the bolster K² is distributed two thirds to the pair of wheels $a^3$ and one third to the two pairs of wheels $a'$ and $a^2$. The equalizer bars F, and consequently the pairs of wheels $a'$ and $a^2$, therefore sustain two thirds of the entire load on the truck while the remaining one third is supported by the pair of wheels $a^3$. In lieu of making the longitudinal center bearing beam K, the bolsters K' and K², and the side frames B' and B², in separate castings, as shown in the embodiment of my invention illustrated in Figs. 1, 2 and 3, I may cast all of these parts integrally, as shown in Fig. 4. In this figure M' and M² designate the side frames; L' and L² the truck bolsters, and L the longitudinal center bearing beam, all of which are formed in an integral casting. The ends of the side frames M' and M² are connected by transverse bars N' and N² which are shown as riveted at their ends to the corresponding ends of the side frames.

From the foregoing description it will be observed that I have invented an improved six-wheel car truck in which the load is equally distributed upon the six wheels without the necessity of spacing the pairs of wheels apart the distance required by the use of the ordinary equalizer bars.

In my improved car truck the load is equally distributed to the wheels by means which permit a minimum length of wheel base, and which consequently permit a more compact truck than heretofore possible.

It will be further observed that my improved car truck when used to support drop bottom freight cars will, on account of its short wheel base, permit the drop doors forming a maximum portion of the floor area, to drop to fully open position, and only a minimum portion of the doors forming the floor area will overlie the car trucks, and hence be restricted in the extent of their opening.

While I have described more or less in detail the specific form in which I have illustrated my invention as embodied, yet I do not wish to be understood as limiting myself thereto, as I contemplate changes in form, proportion of parts, and substitution of equivalents as circumstances may suggest or render expedient without departing from the spirit of my invention.

I claim:

1. In a car truck, the combination with a plurality of axles, of an equalizer bar at each side of the car truck supported upon two adjacent axles, and a supplemental equalizer bar at each side of the truck supported at one end upon the first equalizer bar and at its other end upon a third axle.

2. In a car truck, the combination with a plurality of axles, of means for supporting half the load equally upon two axles, and means for supporting the other half of the load two-thirds upon a third axle and one-third upon said two axles.

3. In a six-wheel car truck, the combination with three axles, of journal boxes supported upon the ends of said axles, an equalizer bar at each side of the truck supported at its ends upon the journal boxes on adjacent axles, and a supplemental equalizer bar at each side of the truck supported at one end upon the axle box on the third axle and at its other end upon said first equalizer bar intermediate of the ends thereof.

4. In a six-wheel car truck, the combination with side frames, of three axles, journal boxes supported upon the ends of said axles, an equalizer bar at each side of the truck supported at its ends upon the journal boxes on adjacent axles, a supplemental equalizer bar at each side of the truck supported at one end upon the journal box on the third axle and at its other end upon said first equalizer bar, and springs supporting said side frames upon each of said equalizer bars intermediate of its ends and upon each of said supplemental bars intermediate of the said third axle and the adjacent axle.

5. In a six-wheel car truck, the combination with the side frames thereof, of two bolsters rigidly connected at their ends to the said side frames, journal boxes supported on the ends of said axles, load-sustaining means supported upon the journal boxes of two adjacent axles, supplemental load-sustaining means supported upon the third axle and upon said first load-sustaining means, and springs supporting the ends of said bolsters upon said load-sustaining means and upon said supplemental load-sustaining means.

6. In a car truck, the combination with a plurality of axles, of an equalizer bar at each side of the car truck supported upon two adjacent axles and having a pocket formed therein intermediate of its ends, and a supplemental equalizer bar at each side of the truck supported at one end in the said pocket of the first equalizer bar and at its other end upon a third axle.

7. In a car truck, the combination with a plurality of axles, of load-sustaining means supported upon two adjacent axles, supplemental load-sustaining means supported upon a third axle and upon said first load-sustaining means, and means for imposing a portion of the load upon each of said load-sustaining means.

8. In a car truck, the combination with a plurality of axles, of load-sustaining means supported upon two adjacent axles and having a pocket therein intermediate of the axles, and a supplemental load-sustaining means supported upon a third axle and upon said first load-sustaining means through engagement with the said pocket therein.

9. In a six-wheel car truck, the combination with three axles, of journal boxes supported on the ends of said axles, an equalizer bar at each side of the truck supported at its ends upon the journal boxes on adjacent axles and having a pocket intermediate of its ends, and a supplemental equalizer bar at each side of the truck supported at one end upon the journal box on the third axle and at its other end in the said pocket in the first equalizer bar.

In testimony whereof, I have subscribed my name.

JOHN O. NEIKIRK.

Witnesses:
GEO. L. WILKINSON,
ANNA L. WALTON.

Copies of this patent may be obtained for five cents each, by addressing the "Commissioner of Patents, Washington, D. C."